2 Sheets—Sheet 1.

C. BYRNE.

Locomotive Head-Light.

No. 8,537. Reissued Jan. 7. 1879.

WITNESSES

E. S. Nottingham

F. O. McCleary

INVENTOR

Christopher Byrne.

By Leggett and Leggett.

ATTORNEYS

C. BYRNE.

Locomotive Head-Light.

No. 8,537. Reissued Jan. 7, 1879.

WITNESSES

C. J. Nottingham

F. O'M. Cleary

INVENTOR

Christopher Byrne.

By Leggett and Leggett.

ATTORNEYS

UNITED STATES PATENT OFFICE.

CHRISTOPHER BYRNE, OF CONNEAUT, OHIO.

IMPROVEMENT IN LOCOMOTIVE HEAD-LIGHTS.

Specification forming part of Letters Patent No. 202,227, dated April 9, 1878; Reissue No. 8,537, dated January 7, 1879; application filed August 9, 1878.

*To all whom it may concern:*

Be it known that I, CHRISTOPHER BYRNE, of Conneaut, in the county of Ashtabula, State of Ohio, have invented a new and Improved Locomotive Head-Light, and do hereby declare that the following is a full, clear, and exact description of the same, reference being had to the accompanying drawings, forming a part of this specification, in which—

Figure 1:
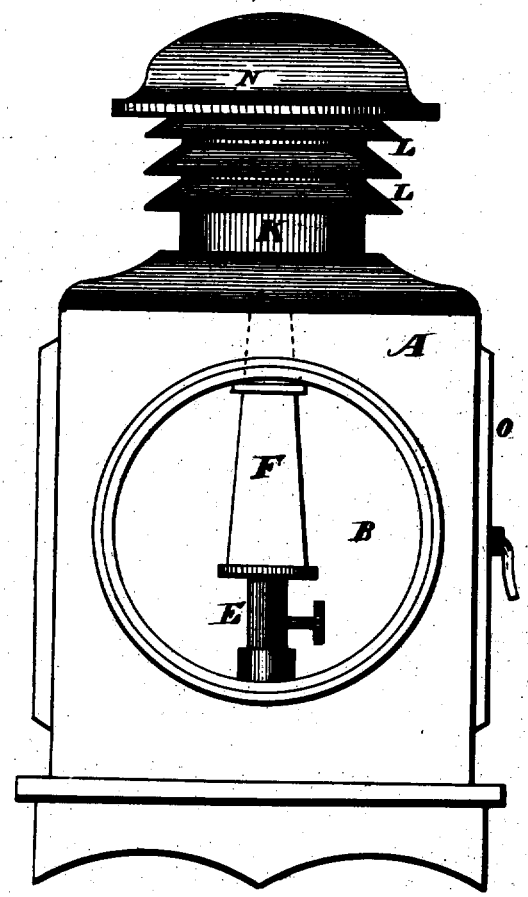
Figure 2:
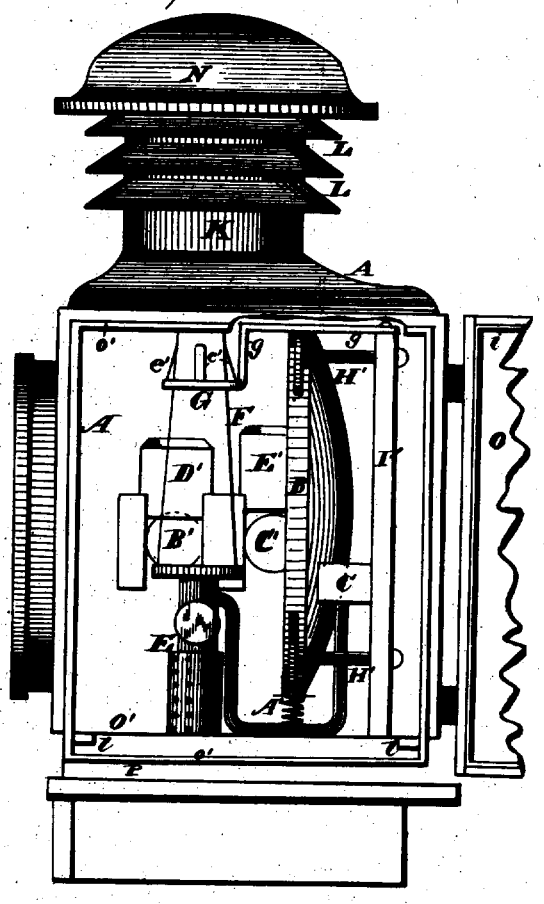
Figure 3:
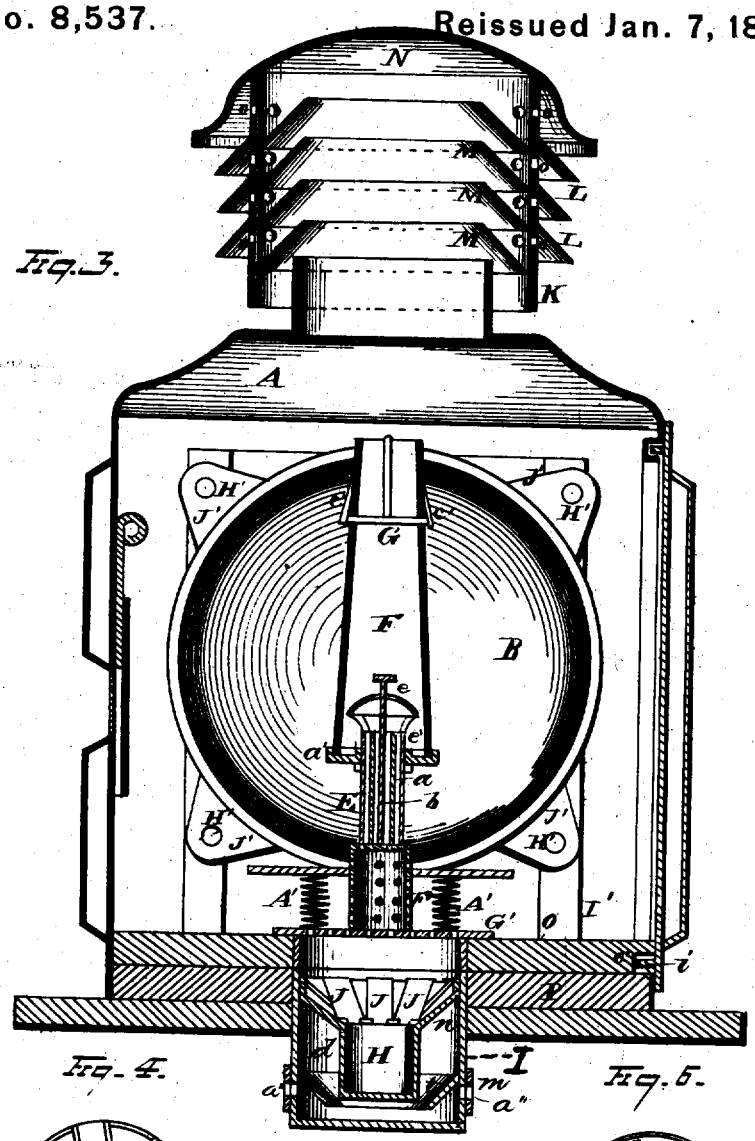
Figure 4:
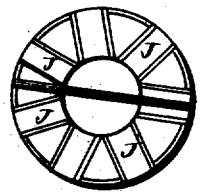
Figure 5:
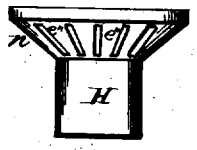
Figure 6:
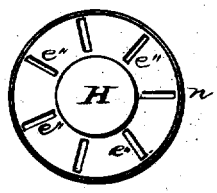

Figure 1 is a front view of the head-light: Fig. 2, a side view of the same with one of the doors open; Fig. 3, a vertical section. Figs. 4, 5, and 6 are details hereinafter referred to.

The invention consists in arranging beneath the reflector springs to sustain a portion of the weight of the reflector and break the jar of the same in traveling; also, in providing a locomotive head-light with a reflector back of its lamp, said reflector provided with mechanism whereby it may be adjusted horizontally about an upright axis, and vertically about a horizontal axis; also, in the particular construction and arrangement of a ventilating device beneath the lamp in a head-light, the construction and arrangement being such as permits the air to enter the device from below, and with means for regulating the amount of air introduced; also, in a construction whereby the dome operates to exclude wind, but permits the escape of smoke; also, a construction of the door and body of the head-light, whereby a tongue upon one may enter a groove in the other and effect a tight joint.

The case or body of the lamp is represented at A, and is or may be of the ordinary shape and size. B is the reflector, having a concave reflecting-surface, and is placed directly back of the lamp, as shown in Fig. 2, and not partially inclosing it, as the reflectors do in the ordinary head-lights. Immediately behind the reflector is the oil-reservoir C, Fig. 2, which is connected to the lamp by a tube, D. Said lamp consists of a shell, E, the lower part of which is perforated, whereas the upper part is close, and in which is secured a wick-tube, *a*, Fig. 3, through which extends a rod, *b*, terminating by a deflecting head or button, *c*. Of said lamp, F is the chimney, the upper end of which is held steadily by a support, G, having fingers *e'*, for clasping the chimney. This chimney-support is maintained in position by a bent rod, *g*, whose rear extremity is fastened to frame I', while its body projects forwardly over the top of the reflector, and thence downwardly to embrace the chimney within the ring which is formed on its free extremity. The vertically-inclined or curved spring-fingers *e*, which are secured to said ring, are independently formed and fastened thereto.

The base of the chimney is secured to the lamp by a cap, consisting of a perforated plate, $a^1$, Fig. 3, in which the chimney stands, and a crown, *e*, attached to a sleeve, $e^1$, fitting on over the end of the lamp, and whereby the said plate is attached thereto. Directly below the lamp is a catch basin or cup, H, Fig. 3, a detached view of which is shown in Fig. 5. Said basin is suspended by a dishing flange, *n*, in a ventilator, I, as shown in Fig. 3, in which it will be seen that between the catch-basin and ventilator there is an annular space, *d*. Said space is in open relation to the space above the catch-basin through openings $e^2$, Figs. 5 and 6.

To prevent the drip and wash from the lamp falling through the said openings, they are protected by raised covers or conductors J, Figs. 3 and 4, down which such drip, &c., will run into the basin.

Air is admitted into the ventilator through perforations $a^2$, made therein around under the annular dishing flange *t*, Fig. 3. Said openings are covered by a band, *m*, having therein corresponding perforations, so that on moving the band the perforations in the ventilator may be closed or opened, as the case may be.

The dome of the lamp consists of a series of deflectors and shields, arranged on the outer and inner sides of the flue K, Figs. 1 and 2. The deflectors are shown at L, which may be more or less in number, and serve to deflect the wind from the outlets for the hot air and smoke.

M, Fig 3, are the shields, which, as will be seen, are arranged around on the inside of the flue, projecting upward, and in such relation to the deflectors L as to further retard the passage of wind down the chimney.

Smoke and gas from the lamp escape to the outside through a series of perforations, *o*, made in the flue immediately under the deflectors L, as shown in said Fig. 3. The deflectors and flue are covered by a crown or cap, N, extending beyond the deflectors, as seen in the drawings.

O, Fig. 2, is the door of the head-light or lantern. Said door is made to shut tight by a groove, *o'*, made in and around the edge of the doorway. A corresponding tongue or rim, *i*, is formed around the edge of the door, which, when the door is shut, is received into the groove, as shown in Fig. 3.

It will be seen that the lamp oil-reservoir and reflector above described are secured to a platform or slide, O', Fig. 2, slid into the case or body A upon the floor P thereof, and which is retained therein by tongues and cleats *l*, Fig. 2. In thus securing the lamp, &c., to the slide, the lamp can be withdrawn from the case for cleaning, &c. A' are springs, on which the reflector is partially supported, and thereby relieved from being too much jarred and jolted by the locomotive. In each side of the head-light are a pair of colored glasses, B' C', Fig. 2, which may be closed by the slides D' and E'. To prevent a rush and undue pressure of air into the chamber or ventilator through the perforations is the purpose of the annular slanting flange or shield *t*, which checks the direct pressure and currents of air from the perforations and deflects them downward, so that the air passes under the edge of the flange, thereby producing a uniform and steady supply of air to the lamp directly through the perforated lower part, F', and through the perforations from the body of the head-light, which is ventilated by a perforated plate, G', covering the ventilating-chamber I, immediately around the base of the lamp, as shown in Fig. 3.

It will be observed that the reflector is supported in position by adjusting-screws H', projecting from the frame I', and screwed into the ears J' of the reflector. By means of the adjusting-screws the reflector can be moved toward or away from the lamp, thereby concentrating the light upon the track near the engine or distant therefrom; or the reflector, by suitable adjustment of the upper and lower screws in opposite directions, may be made to incline downward or upward, or, by adjusting the screws upon the opposite sides in opposite directions, might be made to incline either to the right or left, as the engineer might desire, or as might be rendered necessary should the lantern-case be fastened a little out of true upon the locomotive. The draft-opening, being beneath the lamp, is in the best locality to be uniformly affected under all conditions of travel or changes of weather or direction of the wind.

What I claim is—

1. A locomotive head-light consisting in the combination of a case or shell of a lamp with a reflector adapted to be adjusted horizontally about an upright axis and vertically about a horizontal axis, whereby any desired direction may be given to the reflected light, substantially as set forth.

2. In a locomotive head-light, the combination, with a reflector, of mechanism adapted to adjust the same in a universal-joint movement, whereby the point of concentration of the light may be regulated to any desired point in front of the locomotive, substantially as set forth.

3. In a locomotive head-light, the combination, with a reflector, of two or more horizontal screws located in different vertical planes, and adapted, by engagement with a frame in rear of the reflector, to adjust the latter in side inclination relative to the lamp, substantially as set forth.

4. In a locomotive head-light, the combination, with a reflector and horizontal adjusting-screws, connecting respectively with the four corners thereof, of a rear frame, with which said screws engage, substantially as set forth.

5. The combination, with the reflector of a locomotive head-light, of a spring for supporting the same against jars in traveling.

6. In locomotive head-lights, the concave reflector B, secured in position by adjusting-screws H', and partially supported on springs A', arranged wholly in rear of the lamp, substantially as described, and for the purposes set forth.

7. The ventilator I, damper *m*, and shield *t*, as arranged in relation and in combination with the lamp and body A of a locomotive head-light, substantially as described, and for the purposes specified.

8. In combination with the ventilator I and lamp, the drip-cup H, provided with air-openings $c^2$ and conductors J, in the manner set forth, and for the purpose specified.

9. In locomotive head-lights, a dome consisting of the perforated flue K, deflectors L, cap N, and shields M, arranged in relation to each other substantially as described, and for the purpose set forth.

10. In locomotive head-lights, the door O, provided with a tongue or rib, *i*, so arranged in relation to the groove *o'* of the doorway of the body A as to fit therein on shutting the door, as and for the purposes specified.

CHRISTOPHER BYRNE.

Witnesses:
JNO. CROWELL, JR.,
W. E. DONNELLY.